us007480434B2

(12) United States Patent
Hochberg et al.

(10) Patent No.: US 7,480,434 B2
(45) Date of Patent: Jan. 20, 2009

(54) LOW LOSS TERAHERTZ WAVEGUIDES, AND TERAHERTZ GENERATION WITH NONLINEAR OPTICAL SYSTEMS

(75) Inventors: Michael J. Hochberg, Pasadena, CA (US); Tom Baehr-Jones, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 6 days.

(21) Appl. No.: 11/828,178

(22) Filed: Jul. 25, 2007

(65) Prior Publication Data

US 2008/0151349 A1 Jun. 26, 2008

Related U.S. Application Data

(60) Provisional application No. 60/846,941, filed on Sep. 25, 2006, provisional application No. 60/833,157, filed on Jul. 25, 2006.

(51) Int. Cl.
*G02B 6/00* (2006.01)
(52) U.S. Cl. .................. 385/122; 385/14; 385/129; 385/130; 385/131; 385/132; 385/141
(58) Field of Classification Search ............... 385/122, 385/14, 129, 1, 2, 3, 130, 131, 132, 141, 385/901, 8, 9, 10, 39, 40
See application file for complete search history.

(56) References Cited

U.S. PATENT DOCUMENTS 6,290,253 B1 9/2001 Tietze et al. ................. 385/1

| | | | |
|---|---|---|---|
| 7,043,133 B2 | 5/2006 | Johnson et al. | 385/142 |
| 7,072,531 B2 | 7/2006 | Djordjev et al. | 385/2 |
| 7,200,308 B2 | 4/2007 | Hochberg et al. | 385/122 |
| 7,424,192 B2 * | 9/2008 | Hochberg et al. | 385/122 |
| 2002/0090160 A1 | 7/2002 | Lim et al. | 385/11 |
| 2004/0202429 A1 | 10/2004 | Margalit et al. | 385/49 |
| 2005/0074194 A1 | 4/2005 | Tan et al. | 385/1 |
| 2006/0056760 A1 | 3/2006 | Djordjev et al. | 385/15 |
| 2006/0291791 A1 * | 12/2006 | Hochberg et al. | 385/132 |
| 2007/0035800 A1 * | 2/2007 | Hochberg et al. | 359/237 |
| 2008/0002992 A1 * | 1/2008 | Hochberg et al. | 398/200 |

OTHER PUBLICATIONS

Zhang et al, Low $V_\pi$ Electrooptic Modulators from CLD-1: Chromophore Design and Synthesis, Materials Processing, and Characterization, Am. Chem. Society, 2001, 3043-3050, 13.

* cited by examiner

*Primary Examiner*—Brian M Healy
(74) *Attorney, Agent, or Firm*—Hiscock & Barclay, LLP; Joseph B. Milstein

(57) ABSTRACT

A silicon based source for radiation in the 0.5-14 Terahertz regime. This new class of devices will permit continuously tunable, milli-Watt scale, continuous-wave, room temperature operation, a substantial advance over currently available technologies. The Silicon Terahertz Generator (STG) employs a silicon waveguide for near infrared radiation, situated within a metal waveguide for Terahertz radiation. A nonlinear polymer cladding permits two near-infrared lasers to mix, and through difference frequency generation produces Terahertz output. The small dimensions of the design greatly increase the optical fields, enhancing the nonlinear effect. The design can also be used to detect Terahertz radiation.

28 Claims, 4 Drawing Sheets

LOW LOSS TERAHERTZ WAVEGUIDES, AND TERAHERTZ GENERATION WITH NONLINEAR OPTICAL SYSTEMS

CROSS-REFERENCE TO RELATED APPLICATIONS

This application claims priority to and the benefit of U.S. provisional patent application Ser. No. 60/833,157, filed Jul. 25, 2006, which application is incorporated herein by reference in its entirety, and priority to and the benefit of U.S. provisional patent application Ser. No. 60/846,941, filed Sep. 25, 2006. This application is related to U.S. utility application Ser. No. 11/503,503, pending filed Aug. 11, 2006, and U.S. utility application Ser. No. 11/678,992, filed Feb. 26, 2007, now U.S. Pat. No. 7,424,192 each of which applications is incorporated herein by reference in its entirety.

FIELD OF THE INVENTION

The invention relates to optical sources and detectors in general and particularly to optical and terahertz sources and detectors that use light to modulate light and that employ materials, such as polymers, having large nonlinear optical characteristics.

BACKGROUND OF THE INVENTION

The structure of telecommunications systems today is fundamentally different from that of transistor-based electronics. Broadly speaking, computation is not done today commercially in the optical domain; computation and logic is done with transistor-based logic. Fiber optics are often used for transmitting high speed data streams over longer distances, while slower and shorter-distance communications continues to be dominated by electronic signaling which is often done with copper wires or with short range wireless communication systems, such as WiFi. This is partially a result of the high cost of optical devices, and partially a result of the complexity and cost of the electronics required for high-bit-rate applications.

The very fastest commercially available optical detectors and modulators available today are limited by free-carrier diffusion speeds and by the speed of the supporting electronics to the Gigahertz frequency range. The speeds of such devices have been relatively static for several years, and cannot be expected to increase dramatically in the near future. The electronics to generate high-rate bit streams, and the amplifier electronics required in order to recover high speed signals from high-speed detectors are both quite complex and expensive at speeds exceeding approximately 10 Gb/s.

The field of nonlinear optics is extremely rich in results, and has been around for many years. Basically the premise of nearly all measurements in the field is that one introduces a sufficiently high power flux (or "fluence," a term of art) in an optical material, it is often possible to excite nonlinear behavior, meaning that the properties of the material change with the input optical power. This kind of effect is very often described through the use of, for instance. Chi$^2$ ($\chi^2$) and Chi$^3$ ($\chi^3$) which are material dependent constants that describe the strength of two of the relevant nonlinear optical activities of a material. Some nonlinearities, which are material dependent will work at the full optical frequency, while others are slower. Recently, engineered organic materials have begun to be used for nonlinear optics, because they can be designed to have extremely large $\chi^2$ and $\chi^3$ moments.

It would be desirable to be able to perform computations or analog signal processing purely in the optical domain, without the data stream having to be converted into an electrical signal by a detector. There is a need for systems and methods that can fully exploit the optical properties of materials that exhibit large $\chi^2$ and $\chi^3$ moments without having to provide excessive amounts of optical power to do so.

SUMMARY OF THE INVENTION

In one aspect, the invention features an apparatus for generating terahertz electromagnetic signals. The apparatus comprises a substrate having first, second and third surfaces, the second and the third surfaces disposed on opposite sides of the substrate; an insulating support adjacent the first surface of the substrate; a high index contrast waveguide adjacent the insulating support, the high index contrast waveguide having an input port for receiving a first input light beam having a first frequency and a second input light beam having a second frequency different from the first frequency, and an output port for providing an output light beam; a cladding adjacent the high index contrast waveguide, the cladding comprising a material that exhibits an enhanced nonlinear optical coefficient; and at least two electrically conductive strips, a first electrically conductive strip disposed on the second surface and a second electrically conductive strip disposed on the third surface of the substrate and configured to provide a dual-strip conductive terahertz waveguide. The high index contrast waveguide and the cladding are configured so that, when the first input light beam is provided as a first laser beam having a first frequency, and the second input light beam is provided as a second laser beam having a second frequency, the output light beam appearing at the output port includes a signal at a terahertz frequency corresponding to a difference between the first frequency of the first input light beam and the second frequency of the second input light beam.

In one embodiment, the substrate comprises silicon. In one embodiment, the insulating support comprises silicon and oxygen. In one embodiment, the high index contrast waveguide adjacent the insulating support is silicon. In one embodiment, the high index contrast waveguide has a width dimension in the range of 0.4 µm to 0.6 µm. In one embodiment, the high index contrast waveguide has a thickness dimension of approximately 0.1 µm. In one embodiment, the insulating support has a height dimension of approximately 0.1 µm. In one embodiment, the cladding adjacent the high index contrast waveguide is an optical polymer. In one embodiment, the cladding comprising a material that exhibits an enhanced nonlinear optical coefficient is an electro-optic polymer material. In one embodiment, the at least two electrically conductive strips comprise a metal. In one embodiment, the metal is copper. In one embodiment, the metal comprises at least one metal selected from the group consisting of aluminum, silver and gold. In one embodiment, at least one of the first input light beam and the second input light beam is a continuous-wave laser beam.

In another aspect, the invention relates to a method of generating a terahertz electromagnetic signal. The method comprises the step of providing a structure comprising a substrate having first, second and third surfaces, the second and the third surfaces disposed on opposite sides of the substrate; an insulating support adjacent the first surface of the substrate; a high index contrast waveguide adjacent the insulating support, the high index contrast waveguide having an input port for receiving a first input light beam having a first frequency and a second input light beam having a second frequency different from the first frequency, and an output port for providing an output light beam; a cladding adjacent the high index contrast waveguide, the cladding comprising a material that exhibits an enhanced nonlinear optical coefficient; and at least two electrically conductive strips, a first electrically conductive strip disposed on the second surface and a second electrically conductive strip disposed on the third surface of the substrate and configured to provide a dual-strip conductive terahertz waveguide. The method also includes the steps of providing a first continuous-wave laser beam having a first frequency; providing a second continuous-wave laser beam having a second frequency different from the first frequency, and observing an output light beam at the output port, the output light beam including a terahertz electromagnetic signal at a difference frequency between the first frequency of the first input laser beam and the second frequency of the second input laser beam.

In still another aspect, the invention features an apparatus for detecting terahertz electromagnetic signals. The apparatus comprises a substrate having first, second and third surfaces, the second and the third surfaces disposed on opposite sides of the substrate; an insulating support adjacent the first surface of the substrate; a high index contrast waveguide adjacent the insulating support, the high index contrast waveguide having an input port for receiving a first input electromagnetic radiation beam having a first frequency and a second input electromagnetic radiation beam having a second frequency different from the first frequency, a selected one of the first and the second input electromagnetic radiation beams comprising a terahertz signal, and an output port for providing an output electromagnetic radiation beam; a cladding adjacent the high index contrast waveguide, the cladding comprising a material that exhibits an enhanced nonlinear optical coefficient; and at least two electrically conductive strips, a first electrically conductive strip disposed on the second surface and a second electrically conductive strip disposed on the third surface of the substrate and configured to provide a dual-strip conductive terahertz waveguide. The high index contrast waveguide and the cladding configured so that, when the first input electromagnetic radiation beam and the second input electromagnetic radiation beam are provided as input, the output electromagnetic radiation beam appearing at the output port includes a signal with at least one sideband spaced away from one of the first frequency of the first input electromagnetic radiation beam and the second frequency of the second input electromagnetic radiation beam by a terahertz frequency.

In one embodiment, the substrate comprises silicon. In one embodiment, the insulating support comprises silicon and oxygen. In one embodiment, the high index contrast waveguide adjacent the insulating support is silicon. In one embodiment, the high index contrast waveguide has a width dimension in the range of 0.4 µm to 0.6 µm. In one embodiment, the high index contrast waveguide has a thickness dimension of approximately 0.1 µm. In one embodiment, the insulating support has a height dimension of approximately 0.1 µm. In one embodiment, the cladding adjacent the high index contrast waveguide is an optical polymer. In one embodiment, the cladding comprising a material that exhibits an enhanced nonlinear optical coefficient is an electro-optic polymer material. In one embodiment, the at least two electrically conductive strips comprise a metal. In one embodiment, the metal is copper. In one embodiment, the metal comprises at least one metal selected from the group consisting of aluminum, silver and gold. In one embodiment, at least one of the first input electromagnetic radiation beam and the second input electromagnetic radiation beam is a continuous-wave laser beam.

In yet another aspect, the invention features a method of detecting a terahertz electromagnetic signal. The method comprises the step of providing a structure comprising: a substrate having first, second and third surfaces, the second and the third surfaces disposed on opposite sides of the substrate; an insulating support adjacent the first surface of the substrate; a high index contrast waveguide adjacent the insulating support, the high index contrast waveguide having an input port for receiving a first input electromagnetic radiation beam having a first frequency and a second input electromagnetic radiation beam having a second frequency different from the first frequency, a selected one of the first and second input electromagnetic radiation beams comprising a terahertz signal, and an output port for providing an output electromagnetic radiation beam; a cladding adjacent the high index contrast waveguide, the cladding comprising a material that exhibits an enhanced nonlinear optical coefficient; and at least two electrically conductive strips, a first electrically conductive strip disposed on the second surface and a second electrically conductive strip disposed on the third surface of the substrate and configured to provide a dual-strip conductive terahertz waveguide. The method additionally includes the steps of providing a first electromagnetic radiation beam having a first frequency; providing a second electromagnetic radiation beam having a terahertz frequency different from the first frequency, producing an output electromagnetic radiation beam at the output port; processing the output electromagnetic radiation beam with a selected one of a spectrometer, a monochromator and an interferometer to produce a processed output electromagnetic radiation beam; and detecting the processed output electromagnetic radiation beam with a detector to identify a sideband separated by a terahertz frequency from the first frequency of the first input electromagnetic radiation beam.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
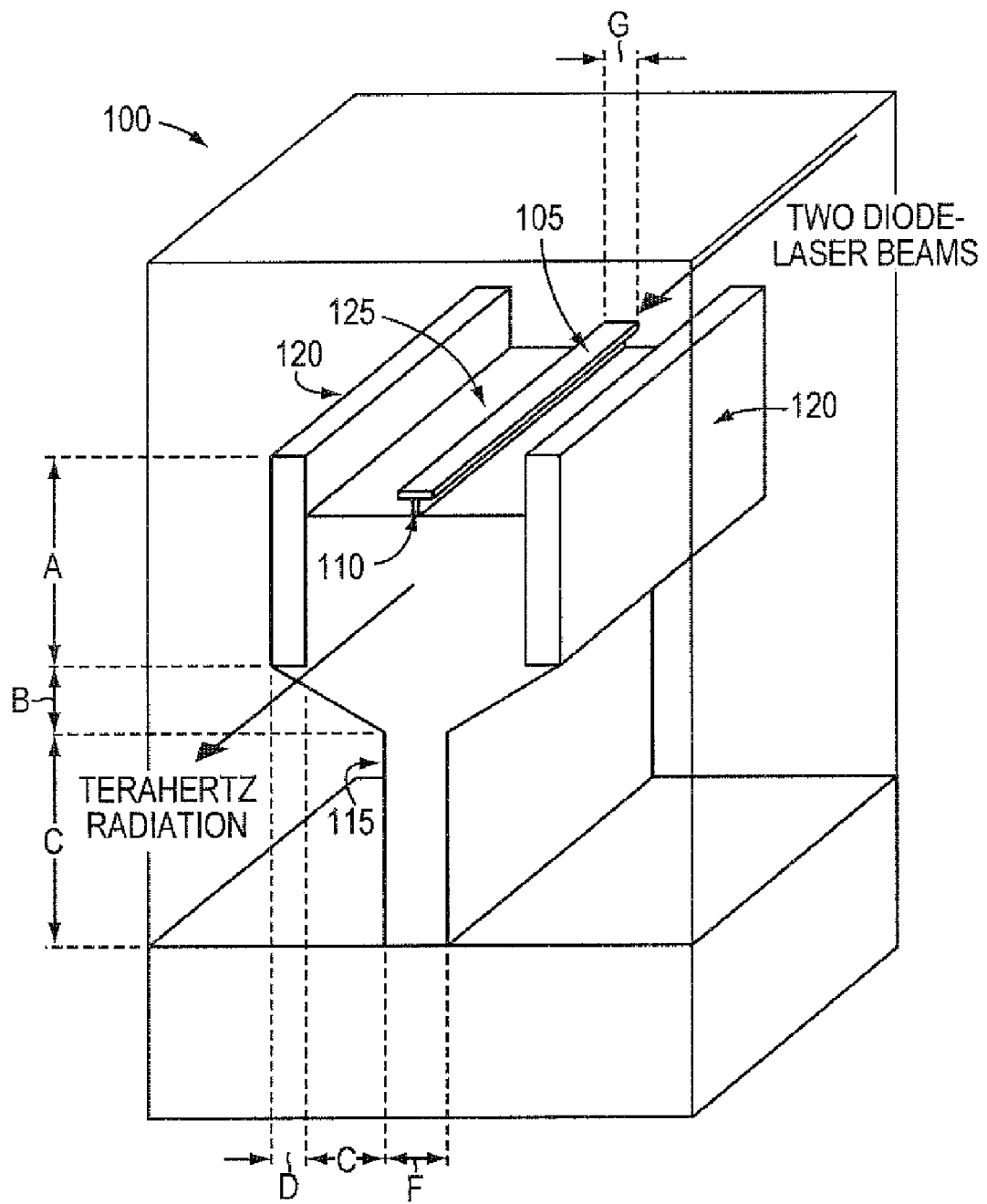
FIG. 1 is a schematic diagram of a Terahertz generation device, showing how the interaction of two beams of light in a waveguide comprising a material having a suitable nonlinear coefficient provides Terahertz radiation as on output, according to principles of the invention.

The applications of Terahertz radiation, roughly defined as electromagnetic radiation with a frequency ranging from 0.5-10 THz, are a topic of active research. They include medical imaging, remote sensing, chemical detection, and tactical imaging. One significant impediment in this field is the expense and complexity associated with Terahertz sources. Current methods for generating THz frequencies include using spectrometers to filter blackbody radiation, pulsed lasers combined with nonlinear optical materials to exploit difference frequency generation, quantum cascade lasers, and high frequency microwave mixers among others. Another recent approach has been to combine quantum cascade lasers and difference frequency generation. Some recent work on Terahertz devices has focused on metamaterials, which may enable switching and control of Terahertz radiation, but this has not yet resulted in significant progress on new Terahertz sources. All of the aforementioned methods of generating Terahertz radiation suffer from either very low operating temperatures, lack of tunability, very low power output, or can only function in pulsed mode. The majority of current approaches to Terahertz generation in fact suffer from several of these problems.

Current approaches to using $\chi^2$ nonlinearities suffer from low conversion efficiencies. This is due in part to the fact that Terahertz modes must have relatively large lateral dimensions, as well as the fact that nonlinear frequency conversion is inherently less efficient when the output is at lower frequencies. That is why current approaches generally require pulsed lasers. Several recent developments have made possible a new approach to difference frequency generation, however. First, it has become possible to guide optical modes with relatively low loss in small, high index contrast, ridge waveguides. Realizations in SOI, for example, achieve 7 dB/cm of loss in a 0.5×0.1 µm waveguide. Second, nonlinear polymers have become increasingly powerful, with an $r_{33}$, the standard metric of nonlinearity, of 170 pm/V already demonstrated. It is expected that a further 3× improvement will be possible, with $r_{33}$ values that will approach 500 pm/V, about an order of magnitude stronger than typical nonlinear crystals. While these nonlinear polymers are typically used for electrooptic modulation, we have shown unambiguously that the nonlinearity is ultrafast.

We describe herein an all-optical terahertz generator and a terahertz waveguide. Such a device is expected to be useful as a practical ultrafast generator of terahertz electromagnetic signals. The generation of terahertz frequencies using two light beams (or electromagnetic radiation beams) as input in silicon-polymer integrated waveguide devices is based upon the all-optical Kerr Effect, the same ultrafast effect used in four-wave mixing. It is also expected that the integrated silicon system described will allow the interconnection of the all-optical generator with electronic systems for interfacing the all-optical generator with more conventional electronic systems, for example to provide user input and output capabilities.

By integrating optical polymers through evanescent coupling to high-mode-confinement silicon waveguides, the effective nonlinearity of the waveguide is greatly increased for cross-phase modulation. The combination of high mode confinement, multiple integrated optical components, and high nonlinearities produces all-optical ultrafast devices operating at power levels compatible with telecommunication systems. These devices are a first step toward large scale integrated ultrafast optical logic in silicon. They operate at frequencies that are two orders of magnitude faster than present silicon devices.

High index contrast waveguides as described herein are useful to concentrate light in order to enhance nonlinear optical effects in various materials so that such effects can be employed to manipulate light (or more generally electromagnetic radiation) at low power levels, as compared to conventional systems and methods that employ nonlinear optical materials. The manipulation of electromagnetic radiation or light can be useful to provide a variety of components that perform operations on light such as rectification and logic operations in a manner analogous to the same operations which are provided using electronic devices operating on electrical signals. For example, an input a light wave to be processed is impressed onto the component. The light wave has at least one parameter characterizing the light wave, such as one of an intensity, a polarization, a frequency, a wavelength, and a duration (e.g., a pulse length, or in the case of continuous wave light, an effectively infinite duration). After the input light wave is processed (or interacts with the waveguide and the clad nonlinear optical material adjacent to the waveguide), an output signal is observed. In a circumstance where the input signal has been processed, the output signal has at least one parameter that is different from at least one parameter characterizing the input light wave, including possibly an electrical output signal when the input light wave had no electrical signal component (e.g., optical rectification).

As described in greater detail herein, the present invention provides methods and structures that exhibit enhancement of the nonlinear effects in various electro-optical materials that is sufficient to make the nonlinear effects accessible with continuous-wave, low-power lasers. As is described herein the waveguide is coated or clad with another material which provides or exhibits an enhanced nonlinear optical coefficient, such as certain kinds of organic electro-optical materials that can be specifically designed to operate in various regions of the electromagnetic spectrum. It is to be understood that if the high contrast waveguide core material itself exhibits a sufficiently large nonlinear optical coefficient of the correct order, e.g., a $\chi^2$ or a $\chi^3$ coefficient, the cladding may be omitted and the waveguide core itself can provide the nonlinear optical effects of interest. We have demonstrated that some designs of high index contrast waveguides are designed to concentrate light in the cladding. In some embodiments, the waveguide is a split waveguide. In some embodiments, the split waveguide is coated with a material which provides an enhanced nonlinear optical coefficient. In some embodiments, the two sides of the split waveguide also comprise electrodes that are used for polling a $\chi^2$ material introduced into the gap. As described herein, in some embodiments, the dispersion of a waveguide is engineered to enhance the optical power in the mode by slowing the propagation of the light. In some embodiments the waveguides are segmented waveguides. As discussed herein, the waveguide can provide optical field enhancement when the structure is arranged into a resonator, which in various embodiments can be either a ring resonator or a linear resonator. It is believes that appropriate claddings can comprise one or more of glass, semiconductor, quantum dots, saturable absorbers, quantum dots doped into an organic mains, electro-optic materials such as polymers and dendrimers, polymers or other organic materials providing large $\chi^3$ coefficients, or other nonlinear optical material to provide large optical nonlinearities through field enhancement in the cladding. In some embodiments, the systems and methods of the invention can be used to provide a tunable infrared source. In some embodiments, by using a low power tunable laser and a high power fixed wavelength laser as the inputs, it is possible to produce a high power coherent tunable source. The tunable source can be a widely tunable coherent source. In addition, using systems and methods of the invention, the use of an incoherent input light source can result in an incoherent tunable source. With the provision of on-chip feedback, the systems and methods of the invention can be used to provide devices that exhibit optical self-oscillation. In some embodiments, the central high index waveguide comprises an amplifying medium, such as a gallium arsenide stripe laser. In some embodiments, where the cladding material exhibits nonlinearities, the laser can be operated as a pulsed source. In some embodiments, systems and methods of the invention can be constructed to provide optical logic functionality, such as optical AND or optical flip-flops. It is believed that systems and method according to the invention can be employed to create optical NAND, OR, NOR and XOR gates, and optical latches, or optical memory. In some embodiments, the systems of the invention can further comprise pump lasers integrated onto the same chip. In some embodiments, the systems of the invention can further comprise off-chip feedback or amplification for frequency conversion or pulse generation. In some embodiments, an additional electrical signal is coupled into the structure to provide active modelocking.

We have developed a set of tools for concentrating light to a high degree by using silicon or other high index contrast waveguides, and we have fabricated devices that demonstrate some of the many applications that can be contemplated when such nonlinear materials are exploited. In particular, by utilizing split waveguides, we are able to greatly enhance the optical fields in the cladding of a tightly confined waveguide, without greatly enhancing the optical losses of the same waveguide. Combining the high field concentrations available from the split waveguides with the high nonlinear activity of nonlinear optical polymers permits the development of nonlinear optical devices operating at much lower optical input power levels than are possible with conventional free space or chip based systems. We have demonstrated four-wave mixing (which is based upon $\chi^3$), as well as optical rectification (based on $\chi^2$), in such waveguides. Using these waveguides it is possible to decrease the power levels needed to observe significant nonlinearities to the point where, by contrast with conventional nonlinear optics, it can be done with non-pulsed, continuous wave lasers.

Chi2 ($\chi^2$) and Chi3 ($\chi^3$) based optical effects can be used in particular to build on-chip optical parametric oscillator ("OPO") systems, where two input wavelengths can be mixed together to produce sum and difference frequencies. These frequencies can be either higher or lower than the input frequencies, and can be made tunable. These effects work for frequencies from the ultraviolet and X-ray regime all the way out into the far infrared and microwave, and in fact can work down to DC in some cases, particularly with optical rectification.

Examples of materials exhibiting Chi2 ($\chi^2$) and Chi3 ($\chi^3$) based optical effects that are believed to be suitable fro use in the present invention are given in U.S. utility application Ser. No. 11/503,503, filed Aug. 11, 2006, which application has been incorporated herein by reference in its entirety. See for example FIGS. 22 and 23 of that application, and the associated descriptions of those figures.

The material of which the high index waveguide is made can be any material having a high index that is reasonably transparent at the wavelengths of interest. This can include but is not limited to silicon, gallium nitride, indium phosphide, indium gallium nitride, gallium phosphide, diamond, sapphire, or the various quaternary III/V and II/VI materials such as aluminum gallium arsenide phosphide. III/V denotes materials having at least one element from column III of the periodic table of elements (or an element that is stable as a positive trivalent ion) and at least one element from column V (or an element that is stable as a negative trivalent ion). Examples of III/V compounds include BN, AlP, GaAs and InP. II/VI denotes materials having at least one element from column II of the periodic table of elements (or an element that is stable as a positive divalent ion) and at least one element from column VI (or an element that is stable as a negative divalent ion). Examples of II/VI compounds include MgO, CdS, ZnSe and HgTe.

We will now present a more detailed description of the systems and methods of the invention, including successively the mechanical structure of exemplary embodiments of high index waveguides, exemplary embodiments of cladding materials having large nonlinear constants $\chi^2$ and their incorporation into devices having high index waveguides, exemplary results observed on some of the fabricated devices that are described, and some theoretical discussions about the devices and the underlying physics, as that theory is presently understood.

Theoretical Description

Although the theoretical descriptions given herein are believed to be correct the operation of the devices described and claimed herein does not depend upon the accuracy or validity of the theoretical description. That is, later theoretical developments that may explain the observed results on a basis different from the theory presented herein will not detract from the inventions described herein.

Maxwell's equations can be written for a nonlinear medium as follows:

$$\begin{pmatrix} \varepsilon_0 \partial_t \varepsilon & -\nabla \times \\ \nabla \times & \mu_0 \partial_t \end{pmatrix} \begin{pmatrix} E \\ H \end{pmatrix} = \begin{pmatrix} -\varepsilon_0 \partial_t \chi^2_{ijk} k E_j E_k \\ 0 \end{pmatrix} \qquad \text{Eq. (1)}$$

We consider our waveguide to be described by a dielectric function that is continuous in the propagation direction, which we take to be the z direction. The inclusion of metals presents no difficulties, if the dielectric constant is permitted to approach infinity in some locations. A guided mode will have the form:

$$c_i(z)\psi_i(x,y)\exp(i\beta_i z - i\omega_i t) \qquad \text{Eq. (2)}$$

We neglect the effects of loss for the moment. Physically, the fields are always real. Therefore, the most general form that a series of propagating waves in a waveguide can be written is:

$$\begin{pmatrix} E \\ H \end{pmatrix} = \sum_i (c_i(z)\psi_i(x, y)\exp(i\beta_i z - i\omega_i t) + \qquad \text{Eq. (3)}$$
$$c_i^*(z)\psi_i(x, y)\exp(-i\beta_i z + i\omega_i t))$$

Note the z dependence of the mode constant. For a linear material, c will not have any z dependence. But for a nonlinear material, this will not necessarily be true. Putting Eq. (2) in Eq. (1) yields:

$$\sum_i \partial_z c_i(z) \begin{pmatrix} H_y(x,y) \\ -H_x(x,y) \\ 0 \\ -E_y(x,y) \\ E_x(x,y) \\ 0 \end{pmatrix} \exp(i\beta_i z - i\omega_i t) + C.C. = \qquad \text{Eq. (4)}$$

$$-\varepsilon_0 \partial_t \begin{pmatrix} \chi^2_{xjk} E_j E_k \\ \chi^2_{yjk} E_j E_k \\ \chi^2_{zjk} E_j E_k \\ 0 \\ 0 \\ 0 \end{pmatrix}$$

Here the mode vector has been expanded to show the individual components. C.C. denotes the complex conjugate of the previous expression. Expanding Eq. (4) yields a series of different equations for different harmonic components. To make the discussion more specific, consider $\omega_1$ and $\omega_2$ to be two optical beams, near 1550 nm. These beams can be selected to generate a difference frequency in the Terahertz. For instance, the difference frequency between a beam at 1550 nm and 1558 nm is about 1 Thz. Let $\omega_3$ be this difference frequency.

$$\partial_z c_3(z) \begin{pmatrix} H_{3,y} \\ -H_{3,x} \\ 0 \\ -E_{3,y} \\ E_{3,x} \\ 0 \end{pmatrix} \exp(i\beta_3 z - i\omega_3 t) = \qquad \text{Eq. (5)}$$

$$-2\varepsilon_0(-i\omega_3)\exp(i\beta_1 z - i\beta_2 z)\exp(-i\omega_3 t)c_1(z)c_2^*(z) \begin{pmatrix} \chi^2_{xjk} E_{1,j} E_{2,k}^* \\ \chi^2_{yjk} E_{1,j} E_{2,k}^* \\ \chi^2_{zjk} E_{1,j} E_{2,k}^* \\ 0 \\ 0 \\ 0 \end{pmatrix}$$

Here $E_1$, $E_2$ and so forth denote the relevant electric or magnetic field patterns for each mode. It should be noted that Eq. (5) is not quite correct; it is possible that additional modes could exist at $\omega 3$, which in principle could be excited as well by the nonlinear perturbation. However, consider that:

$$\int (E_{i,x}^* \; E_{i,y}^* \; E_{i,z}^* \; H_{i,x}^* \; H_{i,y}^* \; H_{i,z}^*) \begin{pmatrix} H_{j,y} \\ -H_{j,x} \\ 0 \\ -E_{j,y} \\ E_{j,x} \\ 0 \end{pmatrix} dA = \qquad \text{Eq. (6)}$$

$$\int (E_i^* \times H_j + E_j \times H_i^*) \cdot z \, dA$$

It can be shown that any two modes at a given frequency with differing propagation constants are orthogonal under the metric given in Eq. (6). Any degenerate subspace can be orthogonalized with conventional methods. As a result, if we assume that there is no degeneracy in the mode set involved in Eq. (5), we can integrate the entire expression across the x, y plane to solve for $\partial_z c_3$. It is worth noting that if the modal field patterns are normalized so that for each mode, Eq. (6) evaluates to 1, then the corresponding physical mode as found in Eq. (4) has a time averaged power flow of 1 Watt. We adopt this convention, and as a result the time averaged power in a mode in watts is equal to the modulus squared of the corresponding modal amplitude $c_i(z)$. Integrating Eq. (5) yields:

$$\partial_z c_3(z) = -2\varepsilon_0(-i\omega_3)\exp(i\beta_1 z - i\beta_2 z - i\beta_3 z)c_1(z)c_2^*(z) \int E_{3,i}^* \chi_{ijk}^2 E_{1,j} E_{2,j}^* dA \qquad \text{Eq. (7)}$$

In the event that the propagation constant difference is zero ($\beta_1-\beta_2-\beta_3=0$), Eq. (7) can be written in a simpler form. Let us also assume that the only important nonlinear contribution in Eq. (7) stems from the nonlinear moment along a single lateral direction, taken to be x without loss of generality. Finally, the possibility of loss for mode 3 is added. In this case:

$$\partial_z c_3(z) = -2(-i\omega_3)c_1(z)c_2^*(z)\chi_{xxx}^2 \gamma - \alpha_3 c_3(z) \qquad \text{Eq. (8)}$$

where the figure of merit, $\gamma$, has units of Volt-seconds per square meter, and is defined to be:

$$\gamma = \epsilon_0 \int E_{3,x}^* E_{1,x}^* E_{2,x}^* dA \qquad \text{Eq. (9)}$$

Let us further assume that the two input beams have negligible loss compared to the generated Terahertz beam, and that only a small fraction of their power is converted to Terahertz radiation. It is then possible to write down the final amount of power that is generated in mode 3 due to nonlinear conversion from modes 1 and 2:

$$P_3(L) = \frac{4\omega_3^2 P_1 P_2 (\chi_{xxx}^2 \gamma)^2}{\alpha_3^2}(1 - \exp(-\alpha_3 L))^2 \qquad \text{Eq. (10)}$$

We note that the phase matching condition in Eq. (7) can be rewritten as:

$$n_3 = \frac{n(\omega_1)\omega_1 - n(\omega_2)\omega_2}{\omega_1 - \omega_2} \qquad \text{Eq. (11)}$$

We show hereinafter that perfect phase matching is attained in a continuous, non-segmented waveguide by engineering the three effective refractive indices of the composite waveguide.

Typically, electrooptic polymers are characterized by their $r_{33}$ coefficient. This is defined as follows:

$$\frac{1}{n_z'^2} - \frac{1}{n_z^2} = E_z r_{33} \qquad \text{Eq. (12)}$$

That is, the shift in refractive index along the poling axis (taken to be z here) is defined as a function of the product of $r_{33}$ and the driving electric field. This can be represented as a $\chi^2$ for small shifts in index as:

$$\chi_{zzz}^2 = \frac{n_z^4 r_{33}}{2} \qquad \text{Eq. (13)}$$

This is only true if the nonlinear effect is not attenuated at higher frequencies. In general, this is often untrue; however, the nonlinear mechanism involved in electrooptic modulation by nonlinear polymers such as these is based on a deformation of an electron orbital, and can thus be expected to be ultrafast. Additionally, we have previously demonstrated optical rectification, an ultrafast phenomenon, based on these polymers, and our results suggested that the $\chi^2$ will be relatively unattenuated at even the optical frequency.

The refractive index of these nonlinear polymers is typically around 1.7. Therefore, if 500 pm/V of tuning is obtained, we can expect a $\chi^2$ of $2\times10^{-9}$ m/V.

Before discussing a particular waveguide configuration, it is useful to calculate the order of magnitude of results that might be expected. Provided that a given interacting waveguide geometry achieves the phase matching condition of Eq. (11) between the various modes, the governing features will be the areas that the modes are in, their effective indices, and the extent of overlap in the region of the nonlinear material. If the modes are normalized so the moment in Eq. (6) is 1 Watt, then the average electric field will be approximately:

$$E = \frac{\sqrt{P}}{\sqrt{2An}}\left(\frac{\mu_0}{\varepsilon_0}\right)^{\frac{1}{4}} \qquad \text{Eq. (14)}$$

Here P is the normalized power, which we set to 1 Watt by convention, while n is the effective index of the mode. Given this expression, one can then calculate Eq. (9) as follows:

$$\gamma = \varepsilon_0 \left(\frac{\mu_0}{\varepsilon_0}\right)^{3/4} \frac{1}{\sqrt{n_1 n_2 n_3}} \frac{A_c}{\sqrt{A_1 A_2 A_3}} \frac{1}{2^{3/2}} \sqrt{P} \qquad \text{Eq. (15)}$$

In Eq. (15) $A_1$, $A_2$ and $A_3$ are the areas of the relevant modes, $n_1$, $n_2$ and $n_3$ the effective indices, and $A_c$ is the area where all of the modes and the $\chi^2$ material overlap; P is the normalized time averaged power of all three modes, which is always set to 1 Watt, included here for clarity of units. With this expression, it is easy to estimate what conversion efficiencies might be approximately obtained for a given interacting waveguide geometry. Let us imagine that we have a engineered a situation where $A_1=A_2=10^{-3}$ m$^2$, $A_3=84\times10^{-12}$ m$^2$, and $A_c=1\times10^{-13}$ m$^2$, and all effective indices are 2. In this case, $\gamma$ will be $8.8\times10^{-4}$ Volt-seconds per square meter.

As will be shown, confinements of Terahertz modes to these kinds of areas are possible, though the waveguides are lossy. In one instance, the loss near 1 Thz is about 25 dB/cm. In this case, $\alpha_3=287$ m$^{-1}$. Assuming that both optical beams are at a power level of 0.5 Watts, the output power would be 1.5 mW. This level of output power would be reached to within 1 dB in about 7.5 mm of device.

Device Design

As one may conclude from the theoretical description presented above, the challenges of designing an STG break down into three areas. First, one needs to design waveguides that will guide both optical and Terahertz radiation, both without crippling losses. Second, one should attempt to optimize the modal overlap with the nonlinear materials to provide efficient difference frequency generation. Third, the waveguides should be designed so that phase matching conditions between the THz and NIR signals are met.

Silicon can be used to guide radiation in the near infrared. Silicon is relatively transparent in much of the Terahertz. In addition, because of silicon's high index, silicon waveguides can concentrate optical modes to areas of 1/1,000 the size of the modes of ordinary optical fibers, and can be evanescently coupled to nonlinear optical polymers. Silicon microscale waveguides can be efficiently coupled both to free space and to fibers, and large-scale integrated photonic structures can be made using such waveguides.

Inexpensive, high power sources in the range of 1480-1600 nm have recently become widely available, due to demand from telecommunications applications. If one uses only pump sources within this frequency range, the frequencies available as a difference of the two sources range from DC to 15 THz. High power lasers are also available in specific bands in the 1300-1480 nm range. However, to our knowledge, single sources that are tunable across the entire range have not been demonstrated. Based on current laser and erbium doped fiber amplifier technology, one can expect to obtain approximately 0.5 W of CW laser power. This power can be expected to increase in the coming years.

The STG designs presented herein comprise a silicon core for guiding near-infrared (NIR) light, within a metal waveguide for confining Terahertz radiation. It is believed that optimal performance would be obtained from copper, but other metals, such as aluminum, silver, and gold, could be used. This basic geometry is shown in FIG. 1. A second-order optical nonlinearity, for example as exhibited by an organic polymer material, enables the two optical signals to mix and generate a difference frequency, and various dimensions can be optimized in order to achieve phase matching.

FIG. 1 is a schematic diagram 100 of the Terahertz generation device. An isometric view of the device is shown. A silicon waveguide 105 atop an oxide pillar 110 is supported by a bulk silicon pillar 115 that has been micromachined, for example using conventional silicon micro-electro-mechanical system (MEMS) technology. Adjacent the silicon pillar 115 and surrounding the silicon waveguide 105 on two sides is a conductive waveguide structure 120, which in one embodiment is expected to be made of a highly conductive metal such as copper. An organic polymer 125 that exhibits appreciable second-order optical nonlinearities can be provided as a cladding medium around the silicon waveguide 105, in order to enhance the nonlinear behavior and thereby improve wave mixing.

Figure 2:
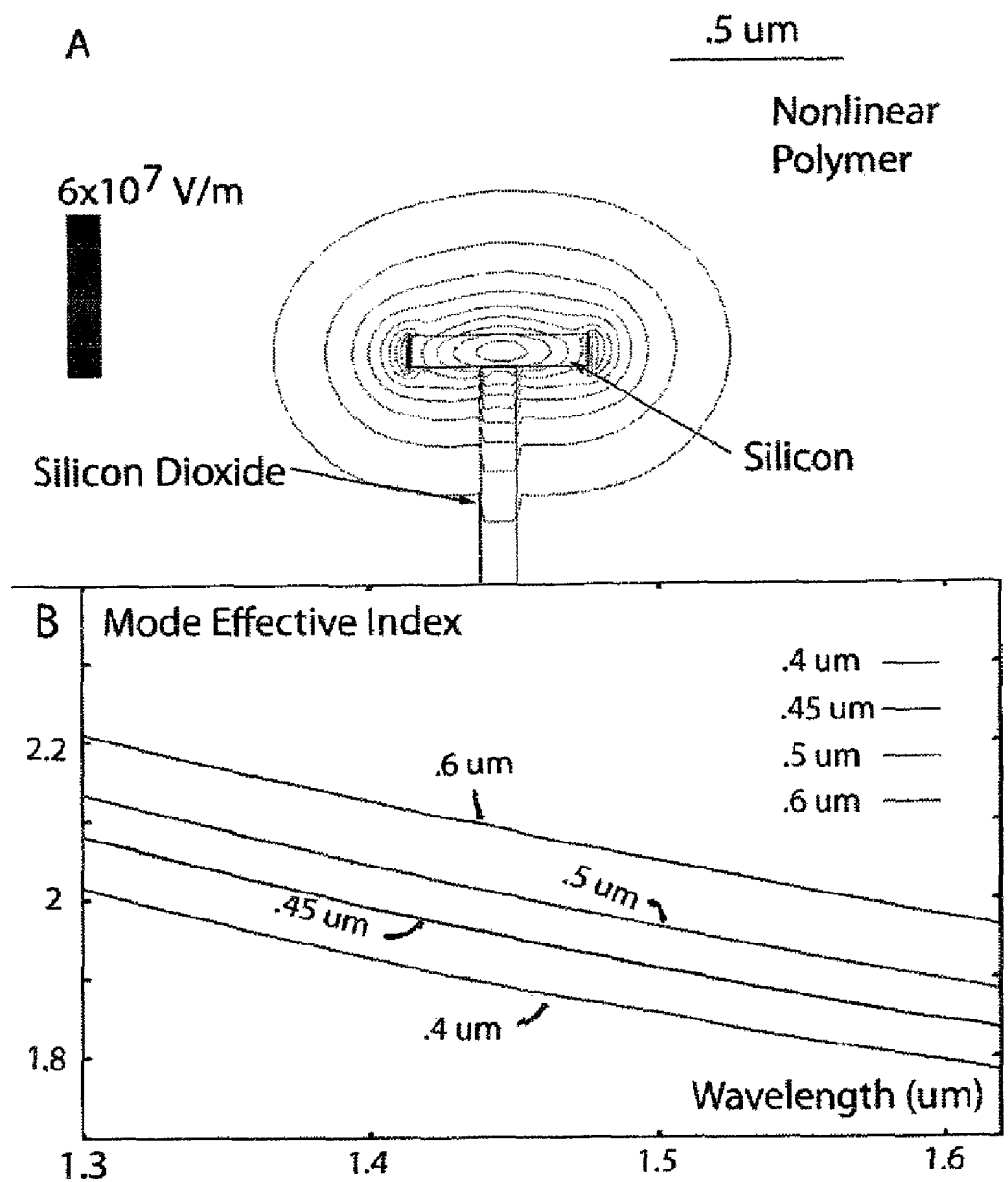
FIG. 2A is a diagram of the optical waveguide, with contours of the mode rendered in increments of 10% of |E| for 1 W of input power, according to principles of the invention.
FIG. 2B is a diagram showing dispersion diagrams as a function of waveguide width, according to principles of the invention.

The optical waveguide in the STG is shown in more detail in FIG. 2A. The optical waveguide comprises a strip of silicon 105 within a dual-strip conductive Terahertz waveguide 120. This entire structure is embedded in a cladding of electrooptic polymer 125 with a refractive index of 1.7. This waveguide geometry creates a significant evanescent near-infrared field, which overlaps with the polymer cladding. FIG. 2A shows the waveguide structure and the optical mode overlaid. The contours of the electric mode are rendered in increments of 10% of |E| assuming 1 W of input power. The waveguide used was 500 nm wide and 100 nm tall. The width of this waveguide is varied as a design parameter. The silicon wire waveguide is supported by a 100 nm wide pillar 110 of $SiO_2$. The effective indices of refraction from three different Si waveguide widths are presented in FIG. 2B, which also shows dispersion diagrams as a function of waveguide width. The modes were solved for using a Hermetian eigensolver such as that described by A. Taflove, *Computational Electrodynamics*, (Artech House, Boston. Mass., 1995). With such guides, phase matching for Terahertz modes with effective indices ranging from 2.8 to 3.2 is practical.

Similar optical waveguides have been shown to have losses of approximately 3.5 dB/cm, and are expected to be amenable to improvement in the future. From perturbation theory, the loss for the optical mode from interactions with the surrounding metal waveguide can be bounded to not exceed 3 dB/cm, and is generally significantly less. As typical device lengths for the nonlinear interaction region are expected to be below 2.5 mm, optical losses of even 10 dB/cm would not be expected to present a limitation.

We expect to achieve two goals in the design of the Terahertz waveguide. First, we want to make the Terahertz mode more compact, since this maximizes the figure of merit, as can be seen from Eq. (15). Second, we want a waveguide that will be relatively broadband. While spanning as much as 10 THz in the optical regime does not amount to a large fractional shift in frequency, the same is certainly not true in the Terahertz regime. As a result, we selected a design comprising a transmission line, since TEM modes often span frequency regimes of many orders of magnitude.

To span the maximum frequency range, two Terahertz waveguide designs (labeled waveguide I and waveguide II) are presented. They are both similar to a conventional copper dual strip transmission line. However, the portion of the transmission line where the mode resides is partially filled with a plug of silicon, which is part of the supporting silicon pillar 115. The purpose of this feature is to raise the effective refractive index of the Terahertz mode, and to ensure that the phase matching condition is met.

The complex geometry of the Terahertz guide causes mode solving to become challenging. The modes were solved by launching the dual-strip transmission line pattern into a full 3d simulation, and observing the field pattern at various points down the waveguide. A steady-state analysis was used on the Yee grid. The discretization was 0.1 μm, and the run length was approximately 120 μm. From the relative uniformity and z behavior of the fields so obtained, it was clear to us that this method yielded the accurate modes. Once the modal pattern is known, the losses and effective indices of the modes were calculated via the relevant closed form expressions.

Figure 3:
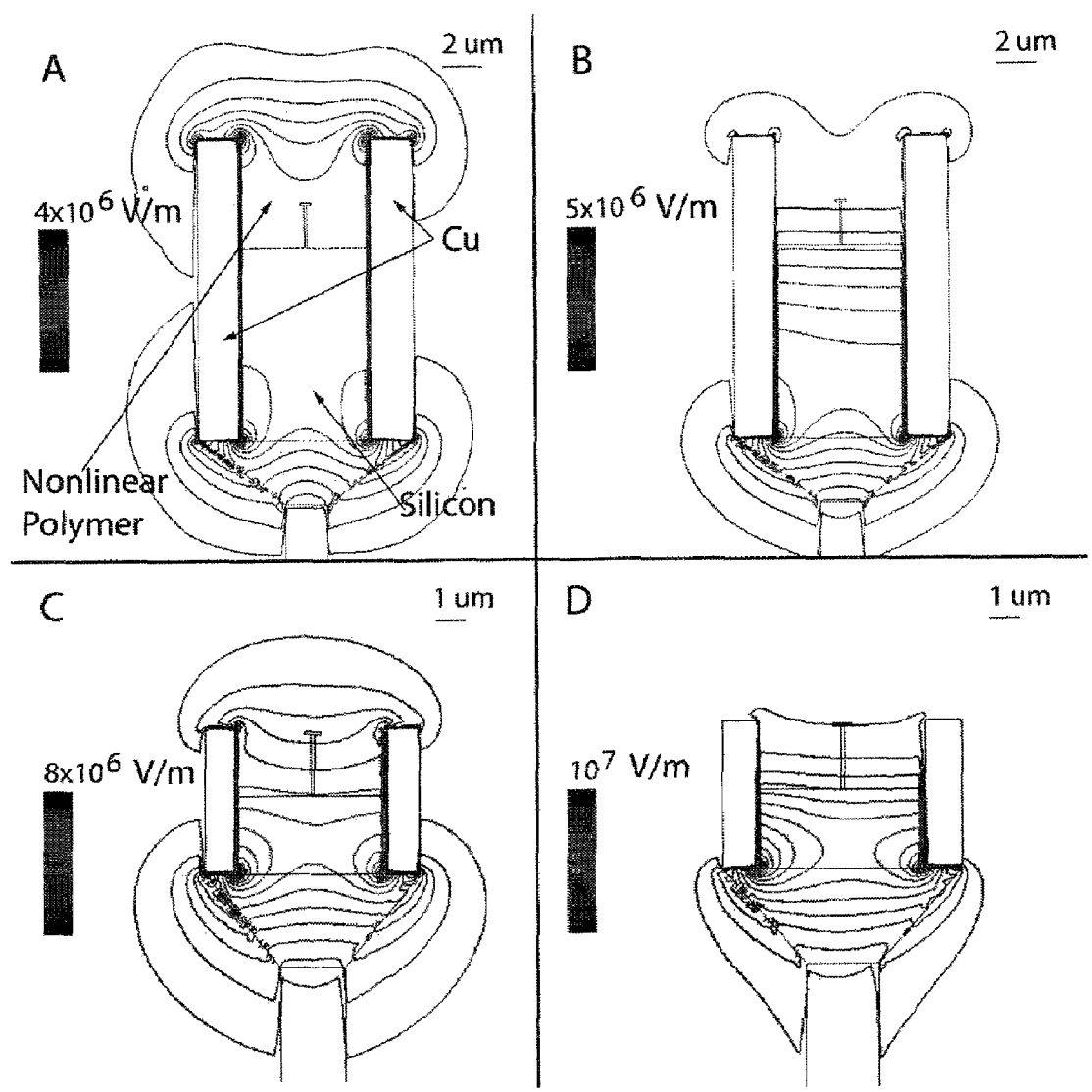
FIG. 3A and FIG. 3B are diagrams that illustrate Terahertz waveguide modal patterns for a first design (waveguide I), at frequencies 1 and 6 THz, respectively, for 1 W of propagating power, according to principles of the invention.
FIG. 3C and FIG. 3D are diagrams that illustrate Terahertz waveguide modal patterns for a second design (waveguide II), at 6 and 14 THz, respectively, according to principles of the invention.

FIG. 3A and FIG. 3B are diagrams that illustrate Terahertz waveguide modal patterns for a first design (waveguide I), at frequencies 1 and 6 THz, respectively, for 1 W of propagating power. FIG. 3C and FIG. 3D are diagrams that illustrate Terahertz waveguide modal patterns for a second design (waveguide II), at 6 and 14 THz, respectively. In all cases, the |E| field contours are plotted in increments of 5%. The maximum field in V/m is also indicated on a scale bar. This is for a mode with a time-average energy of 1 Watt. More information about the designs of waveguide I and waveguide II are presented in Table 1 hereinbelow.

Table 1 provides a description of Terahertz waveguides and device performances. In Table 1 columns A through F correspond to the dimensions shown in FIG. 1. The data in column C refers to the fact that this dimension is to exceed the specified value. Label G is not present in Table 1 as the optical waveguide width is varied independently.

TABLE 1

Description of Terahertz waveguides

| Terahertz waveguide type | A (μm) | B (μm) | C (μm) | D (μm) | E (μm) | F (μm) |
|---|---|---|---|---|---|---|
| I | 14 | 3.5 | >20 | 2 | 2 | 2 |
| II | 4.7 | 3 | >20 | 1 | 1.3 | 2 |

Figure 4:
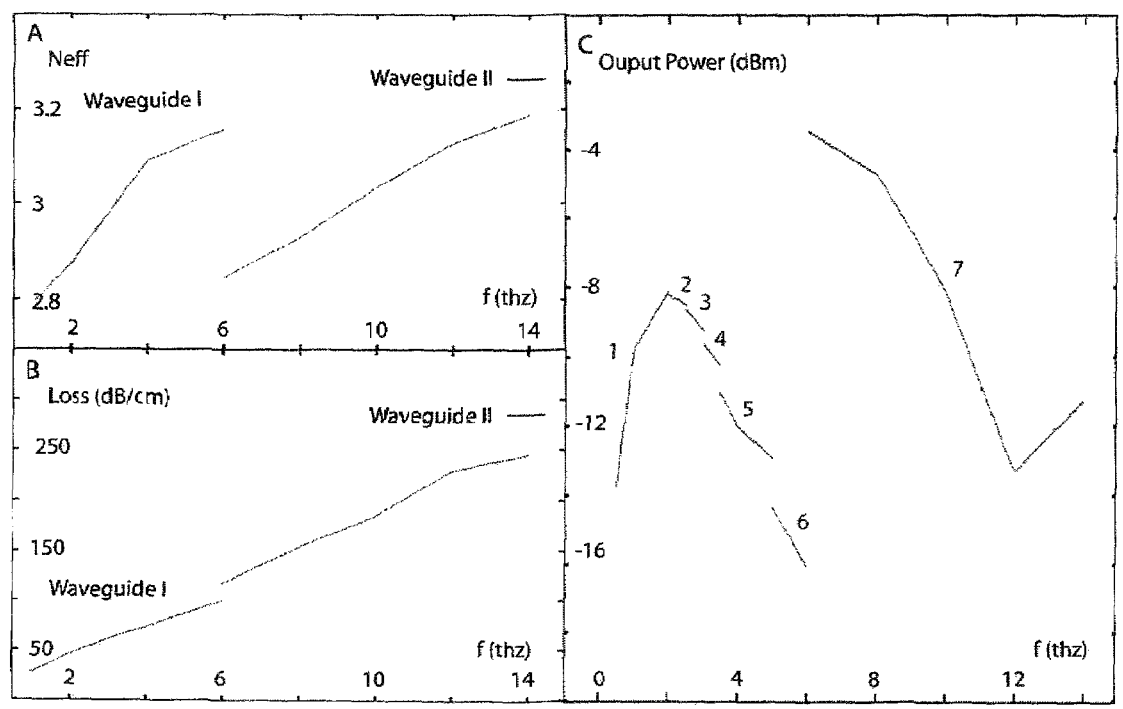
FIGS. 4A-4C are diagrams that illustrates characteristics of Terahertz waveguide modes, and output power, according to principles of the invention.

FIG. 4A-4C are diagrams that illustrate characteristics of Terahertz waveguide modes, and output power. FIG. 4A shows the effective index of the Terahertz modes as a function of frequency. FIG. 4B shows the waveguide loss in dB/cm as a function of frequency. FIG. 4C shows the output power for devices described in Table 2 (hereinbelow), in dBm of output power versus the output frequency in THz.

vide a summary of the CW output powers achievable as a function of wavelength. It is possible to change the waveguide width lithographically, suggesting that these devices may well serve in an array to maximize the frequency coverage on a particular chip. Output power in the high micro-Watt level is predicted across the entire frequency range from 0.5 THz up to 15 THz.

Table 2 provides a full list of the device design parameters for seven designs, along with the performance data expected for each. The two input lasers are assumed to be 500 mW in continuous-wave power. The $\chi^2$ value is taken to be 500 pm/V, or $2\times10^{-9}$ m/V. The optical waveguide loss is taken to be 6 dB/cm, which is a safe upper bound on expected losses. Note that the optical waveguide width corresponds to letter G in FIG. 1. The predicted output spectra generated by these devices are plotted in FIG. 4.

TABLE 2

Description of Terahertz waveguide parameters and device performances

| Device No. | Optical Waveguide Width (μm) | Device Length (mm) | Terahertz Waveguide Type | Output Frequency Range (thz) | Output Power Range (dBm) | Input Laser Range Needed (nm) |
|---|---|---|---|---|---|---|
| 1 | 0.375 | 5 | I | 0.5-2 | −13.7, −8.1 | 1480-1600 |
| 2 | 0.4 | 4 | I | 2-2.5 | −8.2, −8.5 | 1480-1600 |
| 3 | 0.425 | 3 | I | 2.5-3 | −8.6, −9.2 | 1480-1600 |
| 4 | 0.45 | 3 | I | 3-3.5 | −9.6, −10.2 | 1480-1600 |
| 5 | 0.5 | 3 | I | 3.5-5 | −11, −12.9 | 1480-1600 |
| 6 | 0.6 | 2.5 | I | 5-6 | −14.3, −16 | 1480-1600 |
| 7 | 0.4 | 2 | II | 6-14 | −3.4, −11.2 | 1300-1600 |

In FIGS. 4A and 4B, the modal patterns for Terahertz waveguides I and II are shown at various frequency extrema. At higher frequencies, the Terahertz mode tends to migrate into the region with more silicon. This has the deleterious effect of pulling the field away from the optical waveguide, and decreasing the generated power. The effective indices of the Terahertz waveguides are shown in FIG. 4B.

The waveguide loss of the Terahertz mode is highly frequency dependent. This is due to the effect of increased frequency on Ohmic losses, as well as frequency dependence of the mode pattern The oxide pillar supporting the optical waveguide will not significantly impact the Terahertz mode loss, since the relevant mode overlap is very small. Bulk polymer losses as high as 30 dB/cm could be tolerated without significantly altering device performance. It is anticipated that future nonlinear polymers will easily meet this standard. Substrate leakage is not expected to be a major issue, provided that the support pillars are 20 μm or more in height. Even over three-dimensional simulations of 100 μm or more of waveguide, no substrate leakage is evident in such a configuration. While a small amount, perhaps less than 0.1 dB, might remain undetected in these models, this still provides an upper bound of 10 dB/cm, which is far less than the losses due to other sources.

Once the effective indices for the modes are established, and the precise modal patterns known, it is possible to calculate the conversion efficiency via the relations presented in the theoretical discussion given above. Table 2 and FIG. 4 pro- Operation as a Terahertz Detector An important characteristic of these devices is that the generated Terahertz beam can be interchanged with one of the optical beams. This can be seen by noting that Eq. (9) and Eq. (10) are symmetric in the electric fields of all waveguides, to a complex conjugation and a frequency factor in front. As a result, if two optical beams at 0.5 Watts each generate a 1 THz output of 0.5 mW, then an optical beam at 0.5 watts and a Terahertz beam at 0.5 mW will be expected to generate an optical beam of 18 mW in the exact same device. That is, an STG can be used to shift a Terahertz signal into the optical regime, and also add about 15 dB of power. The output beam will be located at the pump optical frequency plus the Terahertz frequency, allowing for Terahertz detection schemes that will use conventional diode- or PMT-based optical detectors, which are extremely sensitive. By examining the output frequency with inexpensive and extremely sensitive optical spectrometers or monochromators in the near infrared, it will be possible to use such devices as a compact, high-sensitivity terahertz spectrometer.

Heating and Free Carrier Limitations on Performance

A typical problem with integrated optical continuous wave devices is the dissipation of waste heat. It is expected that any form of loss that does not result in scattered radiation will eventually convert the optical input energy to heat. Under continuous operation, this heat source will raise the temperature of the waveguide and polymer until it is balanced by heat dissipation mechanisms. If the steady state temperature exceeds a damage threshold, the device will fail prematurely.

Even though radiation at a 1300 nm wavelength and longer is beyond the silicon band edge, various mechanisms can produce free carriers, especially at high power. One such mechanism is two-photon absorption (TPA). In very small silicon ridge waveguides such as the ones we propose to use, surface state absorption can also create free carriers. This creates nonlinear loss on the optical signal, which can lead to rapid signal attenuation. To determine whether this would be a limitation, nonlinear loss measurements were performed on SOI waveguides with the 0.5×0.1 um dimension given above. It was found that the loss within a waveguide was well modeled by $$\frac{dI}{dz} = -\alpha_1 I - \alpha_2 I^2$$ Eq. (16)

where I is the propagating CW intensity of a beam, and where $\alpha_1$ is 0.00014 $\mu m^{-1}$, while $\alpha_2$ was $1.8 \times 10^{-6}$ $\mu m^{-1} mw^{-1}$. This corresponds to about 12 dB/cm of additional loss at a CW power of 150 mW. While this is certainly problematic, it should be remembered that the terahertz waveguide losses are far higher, and so the interaction length in which a terahertz beam can be generated is fairly short. Therefore, the optical losses are not important in most cases until they cause significant attenuation in only a few millimeters. All-optical pump-probe measurements were also performed in order to determine minority carrier lifetimes. The minority carrier lifetime was found to be around 1 ns.

The nonlinear loss can be reduced by removing the free carriers. Several methods have been demonstrated for electrically sweeping excess carriers from a silicon waveguide to reduce effective carrier lifetime. Additionally, it has been demonstrated that ion implantation of $Ar^+$ ions can reduce the free carrier lifetime to 100 ps, which would amount to a decrease in the nonlinear loss our waveguides experience by a factor of 10. It is expected that this approach could also be integrated into our process, since it does not require any change in the waveguide geometry or electrical contact. Finally, it is possible to treat silicon waveguides such as these to reduce surface state absorption and waveguide loss. Lowering the waveguide loss would also help the raise the thermal damage threshold.

Absorption of the terahertz mode by free carrier accumulation is expected to be less important. This is due to the fact that although the absorption coefficient of terahertz radiation due to free carriers is approximately 10 times larger, the area of the silicon waveguide is much less than 10% of the area of the terahertz mode, suggesting that the terahertz mode will not experience larger losses than the optical mode due to a given free carrier concentration. It is believed that optically induced free carrier absorption does not pose a fundamental limitation to the proposed device.

In summary, we expect that devices according to the present design will provide room temperature CW generation of Terahertz radiation. Other than the nonlinear polymer, our system comprises materials that are commonly used in semiconductor manufacturing processes. The STG described herein is expected to function at room temperature, and is expected to provide a level of output power that is far larger than what comparable processes can currently demonstrate.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. An apparatus for generating terahertz electromagnetic signals, comprising:
    a substrate having first, second and third surfaces, said second and said third surfaces disposed on opposite sides of said substrate;
    an insulating support adjacent said first surface of said substrate;
    a high index contrast waveguide adjacent said insulating support, said high index contrast waveguide having an input port for receiving a first input light beam having a first frequency and a second input light beam having a second frequency different from said first frequency, and an output port for providing an output light beam;
    a cladding adjacent said high index contrast waveguide, said cladding comprising a material that exhibits an enhanced nonlinear optical coefficient; and
    at least two electrically conductive strips, a first electrically conductive strip disposed on said second surface and a second electrically conductive strip disposed on said third surface of said substrate and configured to provide a dual-strip conductive terahertz waveguide;
    said high index contrast waveguide and said cladding configured so that, when said first input light beam is provided as a first laser beam having a first frequency, and said second input light beam is provided as a second laser beam having a second frequency, said output light beam appearing at said output port includes a signal at a terahertz frequency corresponding to a difference between said first frequency of said first input light beam and said second frequency of said second input light beam.

2. The apparatus for generating terahertz electromagnetic signals of claim 1, wherein said substrate comprises silicon.

3. The apparatus for generating terahertz electromagnetic signals of claim 2, wherein said insulating support comprises silicon and oxygen.

4. The apparatus for generating terahertz electromagnetic signals of claim 3, wherein said high index contrast waveguide adjacent said insulating support is silicon.

5. The apparatus for generating terahertz electromagnetic signals of claim 4, wherein said high index contrast waveguide has a width dimension in the range of 0.4 µm to 0.6 µm.

6. The apparatus for generating terahertz electromagnetic signals of claim 4, wherein said high index contrast waveguide has a thickness dimension of approximately 0.1 µm.

7. The apparatus for generating terahertz electromagnetic signals of claim 2, wherein said insulating support has a height dimension of approximately 0.1 µm.

8. The apparatus for generating terahertz electromagnetic signals of claim 1, wherein said cladding adjacent said high index contrast waveguide is an optical polymer.

9. The apparatus for generating terahertz electromagnetic signals of claim 1, wherein said cladding comprising a material that exhibits an enhanced nonlinear optical coefficient is an electro-optic polymer material.

10. The apparatus for generating terahertz electromagnetic signals of claim 1, wherein said at least two electrically conductive strips comprise a metal.

11. The apparatus for generating terahertz electromagnetic signals of claim 10, wherein said metal is copper.

12. The apparatus for generating terahertz electromagnetic signals of claim 10, wherein said metal comprises at least one metal selected from the group consisting of aluminum, silver and gold.

13. The apparatus for generating terahertz electromagnetic signals of claim 1, wherein at least one of said first input light beam and said second input light beam is a continuous-wave laser beam.

14. A method of generating a terahertz electromagnetic signal, comprising the steps of:
providing a structure comprising:
a substrate having first, second and third surfaces, said second and said third surfaces disposed on opposite sides of said substrate;
an insulating support adjacent said first surface of said substrate;
a high index contrast waveguide adjacent said insulating support, said high index contrast waveguide having an input port for receiving a first input light beam having a first frequency and a second input light beam having a second frequency different from said first frequency, and an output port for providing an output light beam;
a cladding adjacent said high index contrast waveguide, said cladding comprising a material that exhibits an enhanced nonlinear optical coefficient; and
at least two electrically conductive strips, a first electrically conductive strip disposed on said second surface and a second electrically conductive strip disposed on said third surface of said substrate and configured to provide a dual-strip conductive terahertz waveguide;
providing a first continuous-wave laser beam having a first frequency;
providing a second continuous-wave laser beam having a second frequency different from said first frequency, and
observing an output light beam at said output port, said output light beam including a terahertz electromagnetic signal at a difference frequency between said first frequency of said first input laser beam and said second frequency of said second input laser beam.

15. An apparatus for detecting terahertz electromagnetic signals, comprising:
a substrate having first, second and third surfaces, said second and said third surfaces disposed on opposite sides of said substrate;
an insulating support adjacent said first surface of said substrate;
a high index contrast waveguide adjacent said insulating support, said high index contrast waveguide having an input port for receiving a first input electromagnetic radiation beam having a first frequency and a second input electromagnetic radiation beam having a second frequency different from said first frequency, a selected one of said first and said second input electromagnetic radiation beams comprising a terahertz signal, and an output port for providing an output electromagnetic radiation beam;
a cladding adjacent said high index contrast waveguide, said cladding comprising a material that exhibits an enhanced nonlinear optical coefficient; and
at least two electrically conductive strips, a first electrically conductive strip disposed on said second surface and a second electrically conductive strip disposed on said third surface of said substrate and configured to provide a dual-strip conductive terahertz waveguide;
said high index contrast waveguide and said cladding configured so that, when said first input electromagnetic radiation beam and said second input electromagnetic radiation beam are provided as input, said output electromagnetic radiation beam appearing at said output port includes a signal with at least one sideband spaced away from one of said first frequency of said first input electromagnetic radiation beam and said second frequency of said second input electromagnetic radiation beam by a terahertz frequency.

16. The apparatus for detecting terahertz electromagnetic signals of claim 15, wherein said substrate comprises silicon.

17. The apparatus for detecting terahertz electromagnetic signals of claim 16, wherein said insulating support comprises silicon and oxygen.

18. The apparatus for detecting terahertz electromagnetic signals of claim 17, wherein said high index contrast waveguide adjacent said insulating support is silicon.

19. The apparatus for detecting terahertz electromagnetic signals of claim 18, wherein said high index contrast waveguide has a width dimension in the range of 0.4 µm to 0.6 µm.

20. The apparatus for detecting terahertz electromagnetic signals of claim 18, wherein said high index contrast waveguide has a thickness dimension of approximately 0.1 µm.

21. The apparatus for detecting terahertz electromagnetic signals of claim 16, wherein said insulating support has a height dimension of approximately 0.1 µm.

22. The apparatus for detecting terahertz electromagnetic signals of claim 15, wherein said cladding adjacent said high index contrast waveguide is an optical polymer.

23. The apparatus for detecting terahertz electromagnetic signals of claim 15, wherein said cladding comprising a material that exhibits an enhanced nonlinear optical coefficient is an electro-optic polymer material.

24. The apparatus for detecting terahertz electromagnetic signals of claim 15, wherein said at least two electrically conductive strips comprise a metal.

25. The apparatus for detecting terahertz electromagnetic signals of claim 24, wherein said metal is copper.

26. The apparatus for detecting terahertz electromagnetic signals of claim 24, wherein said metal comprises at least one metal selected from the group consisting of aluminum, silver and gold.

27. The apparatus for detecting terahertz electromagnetic signals of claim 15, wherein at least one of said first input electromagnetic radiation beam and said second input electromagnetic radiation beam is a continuous-wave laser beam.

28. A method of detecting a terahertz electromagnetic signal, comprising the steps of:
providing a structure comprising:
a substrate having first, second and third surfaces, said second and said third surfaces disposed on opposite sides of said substrate;
an insulating support adjacent said first surface of said substrate;
a high index contrast waveguide adjacent said insulating support, said high index contrast waveguide having an input port for receiving a first input electromagnetic radiation beam having a first frequency and a second input electromagnetic radiation beam having a second frequency different from said first frequency, a selected one of said first and second input electromagnetic radiation beams comprising a terahertz signal, and an output port for providing an output electromagnetic radiation beam;

a cladding adjacent said high index contrast waveguide, said cladding comprising a material that exhibits an enhanced nonlinear optical coefficient; and at least two electrically conductive strips, a first electrically conductive strip disposed on said second surface and a second electrically conductive strip disposed on said third surface of said substrate and configured to provide a dual-strip conductive terahertz waveguide;

providing a first electromagnetic radiation beam having a first frequency;

providing a second electromagnetic radiation beam having a terahertz frequency different from said first frequency, producing an output electromagnetic radiation beam at said output port;

processing said output electromagnetic radiation beam with a selected one of a spectrometer, a monochromator and an interferometer to produce a processed output electromagnetic radiation beam; and detecting said processed output electromagnetic radiation beam with a detector to identify a sideband separated by a terahertz frequency from said first frequency of said first input electromagnetic radiation beam.

* * * * *